United States Patent [19]

Marshall

[11] 3,909,551

[45] Sept. 30, 1975

[54] DIAL SELECTIVE INTERCOMMUNICATION SYSTEM

[75] Inventor: Richard A. Marshall, Bensenville, Ill.

[73] Assignee: GTE Automatic Electric Laboratories Incorporated, Northlake, Ill.

[22] Filed: Mar. 4, 1974

[21] Appl. No.: 447,614

[52] U.S. Cl. .......... 179/99; 179/84 SS; 179/18 AD; 179/37

[51] Int. Cl.[2] .......................................... H04M 1/52

[58] Field of Search. 179/99, 18 AD, 18 BA, 84 SS, 179/37

[56] References Cited

UNITED STATES PATENTS

| | | | |
|---|---|---|---|
| 3,582,562 | 6/1971 | Sellari | 179/99 |
| 3,622,710 | 11/1971 | Tothill | 179/18 AD |
| 3,626,106 | 12/1971 | Greening et al. | 179/18 AD |
| 3,739,100 | 6/1973 | Cartwright | 179/18 AD |
| 3,786,194 | 1/1974 | Pinede et al. | 179/18 AD |

*Primary Examiner*—Kathleen H. Claffy
*Assistant Examiner*—Gerald L. Brigance
*Attorney, Agent, or Firm*—Robert J. Black

[57] ABSTRACT

A dial selective intercom system is disclosed wherein all stations in the system are connected to a common talking path and the system provides the capability for applying a single burst of ringing signal to a selected station of the system in response to the dialing of the selected station's associated dial code by a calling station within the system. All stations receive a visual indication when the intercom is in use.

10 Claims, 1 Drawing Figure

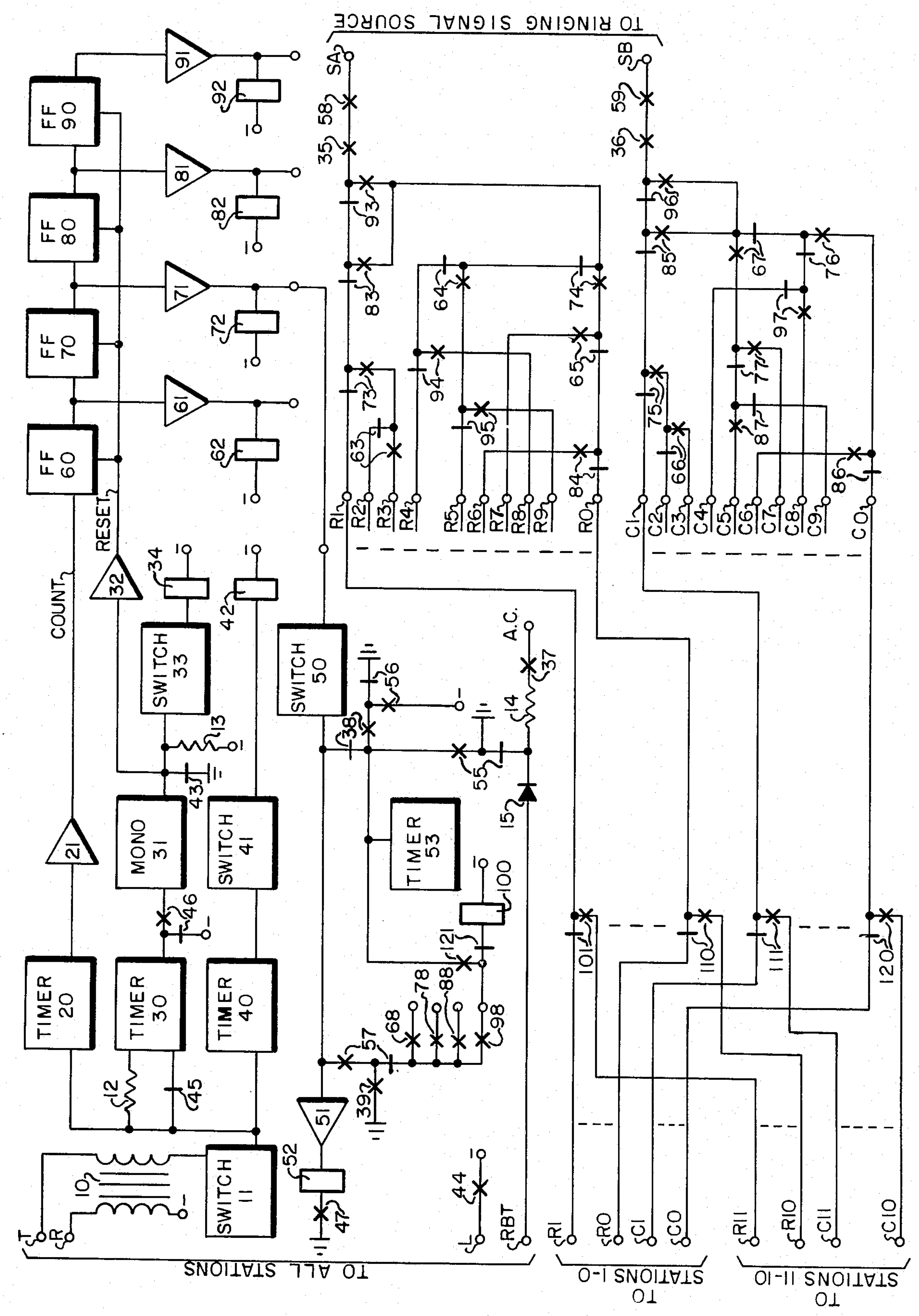
TO RINGING SIGNAL SOURCE
TO ALL STATIONS
TO STATIONS 1-0
TO STATIONS 11-10
FF 60
FF 70
FF 80
FF 90
TIMER 20
TIMER 30
TIMER 40
TIMER 53
MONO 31
SWITCH 11
SWITCH 33
SWITCH 41
SWITCH 50
COUNT
RESET
A.C.

DIAL SELECTIVE INTERCOMMUNICATION SYSTEM

FIELD OF THE INVENTION

This invention pertains to key telephone systems and more particularly to a selective intercom circuit for use with key telephone systems.

DESCRIPTION OF THE PRIOR ART

In prior art intercom key telephone systems switching units usually include a ringing signal source and means which respond to receipt of a dial digit from one of the stations to connect the ringing signal source to a called station and then apply the ringing signal to the called station. In such systems, it becomes necessary for the switching unit to recognize that dialing has been completed so that the ringing signal may be applied. This then is a timing function. Since a single burst of ringing current is usually applied for signaling purposes it is also necessary for the control unit to provide a timed period during which the ringing signal is applied. If both single and two digit codes are employed a requirement exists to activate a transfer circuit between the first and second digit dialed. This also may require an additional timing operation. In the past such timing functions have been typically provided by slow to release relay circuits while other control functions are also provided by relay circuitry.

To provide dial intercom circuitry it has been conventional to use rotary stepping switches with relay controls. Systems such as this have been incorporated in intercom systems manufactured by Automatic Electric Company. In such a system large amounts of current are required and because of the components involved large volumes of space are required to provide this service.

More recently utilization of semiconductor components has substantially reduced the amount of relays required in such intercom systems. System of this sort are disclosed in U.S. Pat. No. 3,450,845 to Morse and U.S. Pat. No. 3,668,331 to Warner. Both of these systems, however, still require substantial numbers of relays to provide control and counting functions in intercom systems. The present invention is drawn to a intercom telephone system that provides all the advantages of prior art telephone systems while reducing still further the number of relays by introducing additional solid state circuitry with its attendant advantages of reduced cost and substantially less space requirement.

SUMMARY OF THE INVENTION

In the present system all stations having access to the intercom service share a common talking path and may access it at all times in a manner similar to that used for party lines. The control circuitry includes a loop current sensor which detects when one of the stations requiring service is in the offhook condition. The loop sensor then operates a timer and a lamp relay which connects power to the lamps of all stations while the intercom is in use, to indicate the busy condition of the circuitry.

The loop current sensor transmits dial pulses through a contact filter buffer which removes contact bounce. The buffer output is then applied to an electronic counter which counts the dial pulses. The four outputs of the counter are in binary-coded-decimal (BCD) form and represent the number that is dialed. Each output from the counter operates a relay. These four relays form a particular form of folded relay tree which is utilized to connect a ringing signal to the called station. In the present circuitry two groups of signal outputs are provided to allow two types of signaling such as ringers or buzzers.

The loop current sensor also controls a ring relay timer. This timer operates a relay which makes the final ringing voltage connection and determines the duration of the burst of ringing current applied. At the end of ringing, the timer will reset the counter for receiving new numbers. During ringing rectified 60 cycle current is connected to the talking path for ring back tone, so that the initiating subscriber may known that the calling number is being signaled.

The present circuitry is adapted to be used as a ten station intercom, or with the addition of an additional relay(s) additional stations in increments of ten. However, for each incremental addition of ten stations, one station out of the original group is lost as this digit is required for accessing of the second group, etc. With the additional relay circuitry for extended capacity, the ring relay operates after the received digit. The circuitry will permit ringing if the digit is for a single digit number or if the digit is the second digit of a two digit number. If the digit is the first of a two digit number, ringing is prevented and relays store the digit. This circuitry will determine which group of stations will receive ringing after the second digit.

DESCRIPTION OF THE DRAWING

The single sheet of drawings appended hereto is a combined functional and schematic diagram of an intercom system for use with a key telephone system in accordance with the present invention.

It should be noted that portions of the present invention are shown in block form. The details of said blocks do not form a portion of the present invention, it being required that they perform only the function described herein. The detailed circuitry of the blocks may assume any of several forms well known in the prior art.

DESCRIPTION OF THE PREFERRED EMBODIMENT

Referring now to the single sheet of drawings appended to the present specification, the dial selective intercom circuit of the present invention is shown connected at terminals T and R to all stations served by the present intercom circuitry. That is to say that all stations having intercom service provided by the present circuitry are connected in common to leads T and R for talking purposes. Talking thus in the present intercom circuit is on a common talking path basis for the multistation intercom system.

Leads T and R are coupled through transformer 10 to a source of negative talking battery and to switch 11 which functions as a line current sensor. In a practical embodiment of the present invention switch 11 may consist of a single stage transistor switch of conventional design. Switch 11 operates in response to one of the associated subscribers stations accessing the present intercom circuit over leads T and R.

It should be noted first that all of the circuitry including all relays of the present circuitry are in their off or static condition. When switch 11 operates timer 20 is also caused to operate. Timer 20 is a conventional RC timer and its details do not form a portion of the present invention. The output of timer 20 after a predetermined period goes to ground, providing a grounded input to buffer amplifier 21 which will then also produce a grounded output on the count lead. The output of the buffer amplifier 21 is connected to a counter consisting of flip-flops 60, 70, 80 and 90. This counter which may be implemented with commercially available flip-flop circuits does not count yet because the output of buffer amplifier 32 is still holding the reset inputs to flip-flops 60, 70, 80 and 90 at ground.

When switch 11 operates timer 30 which is also a conventional RC timer, has its capacitive components charged rapidly through break contact 45 of relay 42. However, even after timer 30 operates the input to monostable multivibrator 31 is not affected because make contact 46 is still in its open or nonoperated condition.

Switch 11 will also supply current to timer 40, also a capacitive timer of conventional design. After a short delay timer 40 will cause switch 41 to operate which in the present embodiment consists of a two stage transistorized switch of conventional design. When switch 41 operates relay 42 is caused to operate. With the operation of relay 42, lamp voltage is connected to the lamps of all stations at contacts 44 and timer 30 output is connected to the input of monostable multivibrator 31 which however, remains unoperated. Break contact 43 releases the input of buffer amplifier 32 from ground switching it to a negative potential through resistor 13. This action will cause the counter consisting of flip-flops 60, 70, 80 and 90 to be prepared for counting.

When the calling station dials, line current is interrupted at a ten pulse per second rate. Switch 11 will turn off and on, and as a result the capacitive component of timer 40 will be partially discharged and recharged. However, switch 41 will remain on, maintaining relay 42 operated. The output of amplifier 21 will switch back and forth between negative potential and ground in response to switch 11. The output dial pulses from buffer amplifier 21 are presented to the count input of the counter consisting of flip-flops 60, 70, 80 and 90. Each of these flipflops is of conventional design and may be implemented as rated with commercially available circuitry. Each time the count input of the flip-flop switches from negative potential to ground, the output changes its state. The four outputs of the counter go to the input of buffers 61, 71, 81 and 91 respectively. The outputs of these buffers are connected to the ringing signal connector relays 62, 72, 82 and 92 respectively. The counter consisting of flip-flops 60, 70, 80 and 90 counts in a binary coded decimal (BCD) sequence until dial pulsing is completed. The table below gives the BCD sequence, with 0 representing a ground condition and 1 a negative potential output.

BCD Counter Table

| After Dial Pulse No. | Rly. 92 | Rly. 82 | Rly. 72 | Rly. 62 |
|---|---|---|---|---|
| Initial | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10(0) | 1 | 0 | 1 | 0 |

(When a ground appears on the reset leads leading to all of the four flip-flops that comprise the stages of the counter, each flip-flop will be driven to the reset condition and the outputs of each stage will be driven to zero).

During dialing periods when switch 11 is off, the capacitive elements of timer 30 will discharge rapidly, but when transistor switch 11 is on it will charge slowly through resistor 12. After the last dial pulse, switch 11 will remain on and the capacitive element of timer 30 will charge beyond a predetermined level causing an output which is applied to the input of monostable multivibrator 31.

As the calling station is dialing the outputs of the flip-flops 60, 70, 80 and 90 are counting in the BCD sequence. These outputs through buffer amplifiers 61, 71, 81 and 91 respectively will operate relays 62, 72, 82 and 92 respectively. The relays will be operated in the sequence indicated above in the table with a one meaning an operated relay. The contacts of these four relays are connected into two "trees" each having a single input and 10 outputs to carry ringing signals to the stations via the leads R1 through R0 and C1 through C0. The number of the lead which is connected to the input is equal to the number of dial pulses which have been received. For example, after 5 dial pulses have been received relays 62 and 82 will be operated and relays 72 and 92 restored. The path from one input (SA) goes through make contacts 58 of relay 52, make contacts 35 of relay 34, break contacts 93 of relay 92, make contacts 83 of relay 82, break contacts 74 of relay 72 and make contacts 64 of relay 62. The other path from input SB goes through make contacts 59 of relay 52, make contacts 36 of relay 34 and break contact 96 of relay 92, make contact 85 of relay 82, make contact 67 of relay 62, break contact 77 of relay 72 and make contact 87 of relay 82 to lead C5. In this manner the outputs are connected and disconnected in sequence as dial pulses are received.

However, no ringing signals will appear at the outputs such as R5 and C5 as outlined above, because contacts 35 and 36 of relay 34 are not operated at this time. After the last dial pulse of the dialed digit a negative potential is forwarded from the output of monostable 31 to the input of switch 33, which consists of a single transistor switch, whose output in turn operates relay 34. With the operation of relay 34 signaling voltages connected at terminals SA and SB are connected by means of relay contacts 35 and 36 respectively over the relay tree paths to the ringer or buzzer at called station.

It should be noted at this time that the outputs of the two relay trees go through a break contacts associated with relay 100. If the present intercom system is equipped to handle ten or fewer stations, relay 100 will not be present or its associated contacts and therefore the output of the relay trees will be wired directly. In the associated drawing, relay 100 and associated contacts have been shown to permit the connection of more than 10 stations, the technique for which will be described hereinafter. Contact 37 of relay 34 connects an alternating 60 cycle potential through resistor 14 and diode 15 to the lead connected to terminal RBT. This lead is wired to the T lead of the circuitry associated with the calling station. The RBT lead will thus carry a rectified alternating current to the calling station, where it will be heard as a ring back tone.

When the output of monostable 31 returns to ground after its time delay, the input to switch 33 will also restore to ground disconnecting the signaling voltages by restoration of relay 34. In this manner the single burst of ringing current which occurs at the end of dialing is cut off. Relay 34 also disconnects the ring back tone from the RBT terminal at contacts 37. At this same time the output terminals from driver 61 through 91 inclusive return to ground and relays 62, 72, 82 and 92 restore. The system is now in its normal conversation state. If the called station does not answer it may be rung again by redialing its number.

It should be noted that during dialing when switch 11 is off the capacitive element of timer 30 is discharged rapidly. When transistor switch 11 is on the capacitive element of timer 30 charges slowly through resistor 12. After the last dial pulse switch 11 stays on and the capacitive element of timer 30 charges to a point above a predetermined point, presenting an output to monostable 31. After the output of timer 30 reaches a predetermined level monostable 31 will operate to provide an operating potential for switch 33. After completion of its operation monostable 31 will apply ground to buffer 32 causing flip-flops 60, 70, 80 and 90 to reset, to the initial zero state, ready to receive further dial digits if any.

It should be noted that the calling station may answer at any time after ringing starts, but ringing is not tripped by answering, but rather is completed in the manner previously described.

When all stations hang up disconnection takes place. Line current ceases to flow when the stations hang up and switch 11 turns off. After a delay, the capacitive element of timer 40 discharges and turns off switch 41 and associated relay 42. At contacts 44 the lamp voltage is disconnected and the circuit is returned to its idle condition.

Assuming now that the system is wired to service more than 10 stations, relays 62, 72, 82, 92 and 34 operate exactly the same as in the manner previously described. In addition relay 52 is also provided which prevents ringing after the first dialed digit of a two digit station code. Its associated contacts 58 and 59 will perform the function of completing the ringing signal from the ringing source to the selected stations. These contacts are not included when 10 or fewer stations are serviced by the present intercom system. Initially the system is programmed by wiring straps for the capacity (number of station codes of the intercom system). For example in a 19 station system the numbers which may be dialed are: 2,3,4,5,6,7,8,9,0,11,12,13,14,15,16,17,18,19,10. The lowest single digit code is two so the input of switch 50 is wired to the output of relay driver 71. When the system is idle all relays and transistors are off and the capacitive element of timer 53 is discharged.

As the calling station dials, the outputs from driver and amplifier 61, 71, 81 and 91 turn on in the BCD sequence. After the second dial pulse the output from amplifier 71 goes to ground and current ceases to flow over the circuit extending to the input of switch 50. This will cause the transistor that forms a portion of switch 50 to turn on and provide current for charging the capacitive element of timer 53. After a predetermined period current will be extended through driver 51 to operate relay 52. Relay 52 has a path completed for its operation from ground through contacts 47 of relay 42. Contacts 55 of relay 52 will provide ground in order to keep the capacitive element of timer 53 charged and maintain driver amplifier 51 operated to provide operating potential for relay 52. Relay 52 remains operated through all remaining dial pulses if any. After the last dial pulse relay 34 operates as before. Ringing signals are now conducted through contacts 35 and 36 as well as contacts 58 and 59 to apply ringing current through the ringing tree. Current through contact 39 and make contact 57 maintain driver 51 and relay 52 operated during ringing. Relay contacts 38 associated with relay 34 disconnect timer 53 from switch 50 connecting it to negative potential through make contact 56 associated with relay 52. The capacitive element of timer 53 is then discharged rapidly. Contacts 37 connect ring back tone to the ring back tone lead.

When the ringing period is completed relay 34 restores. Its contacts disconnecting ringing signals and ring back tone in the manner previously described. Contacts 39 open and contacts 38 transfer the output of switch 50 back to the input of timer 53. Since the capacitive element of timer 53 has been discharged during ringing, current does not flow to the input of buffer 51 so relay 52 restores and the circuit returns to its normal offhook condition.

The description thus far was for dialing single digit numbers in the 19 station system (that is dialing of any single digit from 2 through 0). If a double digit number is dialed, the first digit is a 1 . In this case the outputs of drivers 71, 81 and 91 will be off and the output of driver 61 will be on at the end of dialing. Relay 62 will be operated, but switch 50 will remain off at this time. Therefore, when relay 34 operates after the dial pulse, relay 52 will remain unoperated. Relay 34 will not cause ringing because contacts 58 and 59 are still open. No ring back tone occurs because alternating current is conducted through resistor 14 and break contact 55 to ground. Ground is conducted through break contact 56 and make contact 38 to timer 53 for the charging of the capacitive element therein. Ground is also conducted through contact 39, break contact 57 and make contact 68 of relay 62, through break contact 121 to relay 100. When this ground is present relay 100 operates and latches to ground to make contact 121 over the previously outlined path through make contact 38 and break contact 56.

As shown in the present drawing a single relay 100 has been shown for transfer purposes. As shown it includes a total of 20 contacts 101 through 110 inclusive and 111 through 120 inclusive. However, in a practical embodiment of the present invention a greater number of relays arranged in a slave configuration each having lesser contacts would probably normally be employed. The contacts 101 etc., of relay 100 operate to transfer the ringing outputs of the relay tree to the 10's groups of ringers (11 to 10).

Relay 34 remains operated for a predetermined time as noted previously. When it restores the break contacts 38 will pass current from the capacitive element of timer 53 to buffer amplifier 51 turning it on and in turn operating relay 52. Through make contacts 55 ground will be applied to the input of buffer 51 to maintain it in the operated condition.

At this point relays 42, 52 and 100 are operated. The second digit is now dialed and the called station is signaled as previously described for dialing a single digit. When relay 34 restores after the ringing interval, buffer amplifier 51 will turn off and relay 52 is restored in the manner previously described. Relay 100 will also restore and the system returned to the off-hook state.

If the system is to be programmed for other capacities, circuit operation will be similar. In a 28 station system for example the input of switch 50 will be strapped to the output of driver amplifiers 61 and 71. Therefore, switch 50 can turn on only when amplifier 61 and 71 are operated which happens only if the digit three or higher is dialed. The single digit codes are three to zero and double digit codes begin with a one or a two. Obviously there will also be an additional relay similar to relay 100 to switch the ringing outputs to the 20's group of stations.

While only a single embodiment of the present invention has been shown, it will be obvious to those skilled in the art that numerous modifications can be made without departing from the spirit and scope of the present invention, which shall be limited only by the claims appended hereto.

What is claimed is:

1. An intercommunicating telephone system comprising: a first plurality of dial telephone stations each equipped with a ringer and visual indicating means; a plurality of timers; first switching means connected between all of said stations and said timers, said first switching means initially operated in response to the off-hook state of a calling one of said stations; second switching means including a circuit connection to said visual indicating means at each of said telephone stations; a first one of said timers connected between said first and second switching means, said first timer operated after a predetermined period of time in response to said initial operation of said first switching means to operate said second switching means; said operated second switching means effective to operate said visual indicating means at each of said telephone stations; counting means including at least one circuit connection to each of said telephone stations and at least one circuit connection to a source of ringing signals; a second one of said plurality of timers connected between said first switching means and said counting means, said second timer operated after a predetermined period of time in response to said initial operation of said first switching means, to prepare an operating path to said counting means; said first switching means further operated in response to each dial pulse transmitted from a calling one of said telephone stations; said counting means operated in response to each further operation of said first switching means to count the number of dial pulses transmitted by said calling station and prepare a circuit connection between said ringing signal source and a called one of said stations; said first switching means finally operated in response to completion of dial pulses by said calling station; a third one of said timers operated after a predetermined period of time in response to said final operation of said first switching means; third switching means including at least one circuit connection between said ringing signal source and said counting means; a monostable circuit connected between said third timer and said third switching means, operated in response to said third timer operation to generate an output signal for a predetermined time to said third switching means; said third switching means operated in response to said monostable circuit to complete a circuit connection from said ringing signal source through said counting means to said called station for a predetermined period of time; ringing signals transmitted by said ringing signal source over said completed connection to said called station to render said ringer at said called station operated for a predetermined period of time.

2. An intercommunicating telephone system as claimed in claim 1 wherein: said third switching means further include circuit connections to a source of ring back tone and to said calling station, and in response to operation of said third switching means, a circuit connection is completed between said ring back tone source and said calling station.

3. An intercommunicating telephone system as claimed in claim 1 wherein: said second switching means comprise an electronic switch connected to said first timer and a relay connected between said electronic switch and said visual indicating means at each of said telephone stations, said electronic switch operated in response to said first timer and said relay operated in response to operation of said electronic switch.

4. An intercommunicating telephone system as claimed in claim 1 wherein: said counting means comprise a multistage electronic counter and a plurality of relays, each of said relays connected to a different one of said counter stages and said relays in combination including at least one circuit connection to a source of ringing current and a circuit connection to each of said telephone stations.

5. An intercommunicating telephone system as claimed in claim 1 wherein: there is further included a buffer circuit between said second timer and said counting means.

6. An intercommunicating telephone system as claimed in claim 1 wherein: said third switching means include an electronic switch connected to said monostable circuit, and a relay connected to said electronic switch and including at least one circuit connection between said ringing signal source and said counting means; said electronic circuit operated for a predetermined period of time in response to said monostable circuit, and said relay operated in response to operation of said electronic switch complete a circuit connection from said ringing signal source to said counting means.

7. An intercommunicating telephone system as claimed in claim 1 wherein: there is further included a second plurality of dial telephone stations each equipped with a ringer; transfer means including circuit connections to said counting means and individual circuit connections to said first plurality of telephone stations and to said second plurality of telephone stations, said transfer means operated in response to the transmission of a particular number of dial pulses by said calling station to disconnect a circuit connection between said ringing signal source and said first plurality of dial telephone stations and established a circuit connection between said ringing signal source and said second plurality of stations.

8. An intercommunicating telephone system as claimed in claim 7 wherein: said transfer means include fourth switching means connected to said counting means and including a plurality of circuit connections between said ringing signal source and said first and second pluralities of telephone stations.

9. An intercommunicating telephone system as claimed in claim 8 wherein: said fourth switching means include an electronic switch connected to said counting means and at least a first relay connected to said electronic switch, including output circuit connections to said first and second plurality of telephone stations, and a second relay connected between said ringing source and said first relay connections; said first relays operated in response to operation of said electronic switch to disconnect circuit connections between said ringing signal source and said first plurality of telephones and establish circuit connections between said ringing signal source and said second plurality of telephone stations; and said second relay operated in response to said electronic switch to complete a circuit connection between said ringing source and said circuit connections established to said second plurality of stations.

10. An intercommunicating telephone system as claimed in claim 9 wherein: said transfer means further include a fourth timer operated to inhibit the operation of said fourth switching means for a predetermined period of time.

* * * * *